(12) United States Patent
Horowitz

(10) Patent No.: US 6,987,889 B1
(45) Date of Patent: *Jan. 17, 2006

(54) SYSTEM AND METHOD FOR DYNAMIC PERCEPTUAL CODING OF MACROBLOCKS IN A VIDEO FRAME

(75) Inventor: Michael Horowitz, Austin, TX (US)

(73) Assignee: Polycom, Inc., Milpitas, CA (US)

(*) Notice: Subject to any disclaimer, the term of this patent is extended or adjusted under 35 U.S.C. 154(b) by 543 days.

This patent is subject to a terminal disclaimer.

(21) Appl. No.: 10/218,270

(22) Filed: Aug. 12, 2002

Related U.S. Application Data

(60) Provisional application No. 60/311,375, filed on Aug. 10, 2001, provisional application No. 60/311,405, filed on Aug. 10, 2001.

(51) Int. Cl.
  *G06K 9/46* (2006.01)
  *G06K 9/36* (2006.01)
(52) U.S. Cl. .................... 382/239; 382/251
(58) Field of Classification Search ............... 382/232, 382/233, 236, 239, 243, 251; 341/51; 381/2; 348/14.12, 14.13; 704/200.1, 229; 375/240.01, 375/240.02, 240.03, 240.08, 240.24
See application file for complete search history.

(56) References Cited

U.S. PATENT DOCUMENTS

| | | | |
|---|---|---|---|
| 5,488,665 A * | 1/1996 | Johnston et al. ............... 381/2 |
| 6,043,844 A * | 3/2000 | Bist et al. .............. 375/240.24 |
| 6,246,345 B1 * | 6/2001 | Davidson et al. ............. 341/51 |
| 6,314,208 B1 * | 11/2001 | Konstantinides et al. ... 382/239 |
| 6,363,338 B1 * | 3/2002 | Ubale et al. ............. 704/200.1 |
| 6,366,705 B1 * | 4/2002 | Chiu et al. ................... 382/239 |
| 6,499,010 B1 * | 12/2002 | Faller ......................... 704/229 |
| 6,864,909 B1 * | 3/2005 | Horowitz ................. 348/14.12 |
| 2001/0043754 A1 * | 11/2001 | Memon et al. ............. 382/251 |

* cited by examiner

*Primary Examiner*—Andrew W. Johns
*Assistant Examiner*—Amir Alavi
(74) *Attorney, Agent, or Firm*—Wong, Cabello, Lutsch, Rutherford & Brucculeri, LLP

(57) ABSTRACT

The present invention allows higher quality video images to be transmitted without a concomitant increase in a total number of video data bits transmitted per frame. Quantization parameters are applied to coefficients of macroblocks within a given video frame. A lower value of the quantization parameter is applied near a central region of a video frame. This central region is referred to as a prime video region. Applying the lower quantization parameter to the prime video region has the effect of increasing the video data bit density within that area. Outside of the prime video region, the video data bit density per macroblock is decreased so as to have a zero net-gain in bit density over the entire video frame. Furthermore, there may be a plurality of prime video regions where quantization parameters are dynamically coded. In this case, the value of the quantization parameter will increase or decrease within a given prime video region based on a relative importance of a particular prime video region. Consequently, a quantization parameter matrix may vary depending on the video scene.

25 Claims, 7 Drawing Sheets

110
Video Frame

| 4 | 4 | 4 | 4 | 4 | 4 | 4 | 4 | 4 | 4 | 4 | 4 | 4 | 4 | 4 | 4 | 4 | 4 | 4 | 4 | 4 |
|---|---|---|---|---|---|---|---|---|---|---|---|---|---|---|---|---|---|---|---|---|
| 4 | 1 | 1 | 1 | 1 | 0 | 0 | 0 | 0 | 0 | 0 | 0 | 0 | 0 | 0 | 0 | 0 | 1 | 1 | 1 | 4 |
| 2 | 1 | 1 | 1 | 0 | 0 | 0 | 0 | 0 | 0 | 0 | 0 | 0 | 0 | 0 | 0 | 0 | 0 | 1 | 1 | 2 |
| 2 | 1 | 1 | 0 | 0 | 0 | 0 | 0 | 0 | 0 | 0 | 0 | 0 | 0 | 0 | 0 | 0 | 0 | 0 | 1 | 2 |
| 2 | 1 | 1 | 0 | 0 | -1 | -1 | -1 | -1 | -1 | -1 | -1 | -1 | -1 | -1 | -1 | -1 | 0 | 0 | 1 | 2 |
| 2 | 1 | 0 | 0 | 0 | -1 | -1 | -2 | -1 | -1 | -1 | -1 | -1 | -1 | -2 | -1 | -1 | 0 | 0 | 0 | 2 |
| 2 | 1 | 0 | 0 | 0 | -1 | -1 | -1 | -4 | -4 | -4 | -4 | -4 | -4 | -1 | -1 | -1 | 0 | 0 | 0 | 2 |
| 2 | 1 | 0 | 0 | 0 | -1 | -1 | -1 | -4 | -4 | -4 | -4 | -4 | -4 | -1 | -1 | -1 | 0 | 0 | 0 | 2 |
| 2 | 1 | 0 | 0 | 0 | -1 | -1 | -1 | -4 | -4 | -4 | -4 | -4 | -4 | -1 | -1 | -1 | 0 | 0 | 0 | 2 |
| 2 | 1 | 0 | 0 | 0 | -1 | -1 | -1 | -4 | -4 | -4 | -4 | -4 | -4 | -1 | -1 | -1 | 0 | 0 | 0 | 2 |
| 2 | 1 | 0 | 0 | 0 | -1 | -1 | -1 | -4 | -4 | -4 | -4 | -4 | -4 | -1 | -1 | -1 | 0 | 0 | 0 | 2 |
| 2 | 1 | 0 | 0 | 0 | -1 | -1 | -2 | -1 | -1 | -1 | -1 | -1 | -1 | -2 | -1 | -1 | 0 | 0 | 0 | 2 |
| 2 | 1 | 0 | 0 | 0 | -1 | -1 | -1 | -1 | -1 | -1 | -1 | -1 | -1 | -1 | -1 | -1 | 0 | 0 | 0 | 2 |
| 2 | 1 | 1 | 0 | 0 | 0 | 0 | 0 | 0 | 0 | 0 | 0 | 0 | 0 | 0 | 0 | 0 | 0 | 0 | 1 | 2 |
| 2 | 1 | 1 | 1 | 0 | 0 | 0 | 0 | 0 | 0 | 0 | 0 | 0 | 0 | 0 | 0 | 0 | 0 | 1 | 1 | 2 |
| 2 | 1 | 1 | 1 | 1 | 1 | 0 | 0 | 0 | 0 | 0 | 0 | 0 | 1 | 1 | 1 | 1 | 1 | 1 | 1 | 2 |
| 4 | 1 | 1 | 1 | 1 | 1 | 1 | 1 | 1 | 1 | 1 | 1 | 1 | 1 | 1 | 1 | 1 | 1 | 1 | 1 | 4 |
| 4 | 4 | 4 | 4 | 4 | 4 | 4 | 4 | 4 | 4 | 4 | 4 | 4 | 4 | 4 | 4 | 4 | 4 | 4 | 4 | 4 |

610

410
Prime Video Region

SYSTEM AND METHOD FOR DYNAMIC PERCEPTUAL CODING OF MACROBLOCKS IN A VIDEO FRAME

CROSS-REFERENCE TO RELATED APPLICATIONS

This application claims priority and benefit of U.S. Provisional Application No. 60/311,375, entitled "Dynamic Perceptual Coding of Macroblocks in a Video Frame" filed Aug. 10, 2001 and U.S. Provisional Application No. 60/311, 405, entitled "Static Perceptual Coding of Macroblocks in a Video Frame" filed Aug. 10, 2001, both of which are herein incorporated by reference in their entirety. This application additionally is related to copending utility application entitled "System and Method for Static Perceptual Coding of Macroblocks in a Video Frame," filed Aug. 10, 2002.

BACKGROUND OF THE INVENTION

1. Field of the Invention

The present invention relates to video images, and more particularly to a system and method of enhancing video coding.

2. Description of the Background Art

Video images have become an increasingly important part of communications in general. The ability to nearly instantaneously transmit still images, and particularly, live moving images, has greatly enhanced global communications.

In particular, videoconferencing systems have become an increasingly important business communication tool. These systems facilitate meetings between persons or groups of persons situated remotely from each other, thus eliminating or substantially reducing the need for expensive and time-consuming business travel. Since videoconference participants are able to see facial expressions and gestures of remote participants, richer and more natural communication is engendered. In addition, videoconferencing allows sharing of visual information, such as photographs, charts, and figures, and may be integrated with personal computer applications to produce sophisticated multimedia presentations.

To provide cost-effective video communication, the bandwidth required to convey video must be limited. The typical bandwidth used for videoconferencing lies in the range of 128 to 1920 kilobits per second (Kbps). Problems associated with available videoconferencing systems as these systems attempt to cope with bandwidth limitations include slow frame rates, which result in a non-lifelike picture having an erratic, jerky motion; the use of small video frames or limited spatial resolution of a transmitted video frame; and a reduction in the signal-to-noise ratio of individual video frames. Conventionally, if one or more of these solutions is not employed, higher bandwidths are then required.

At 768 Kbps, digital videoconferencing, using state-of-the-art video encoding methods, produces a picture that may be likened to a scene from analog television. Typically, for most viewers, twenty-four frames per second (fps) are required to make video frames look fluid and give the impression that motion is continuous. As the frame rate is reduced below twenty-four fps, an erratic motion results. In addition, there is always a tradeoff between a video frame size required and available network capacity. Therefore, lower bandwidth requires a lower frame rate and/or reduced video frame size.

A standard video format used in videoconferencing, defined by resolution, is Common Intermediate Format (CIF). The primary CIF format is also known as Full CIF or FCIF. The International Telecommunications Union (ITU), based in Geneva, Switzerland (www.itu.ch), has established this communications standard. Additional standards with resolutions higher and lower than CIF have also been established. Resolution and bit rate requirements for various formats are shown in the table below. The bit rates (in megabits per second, Mbps) shown are for uncompressed color frames where 12 bits per pixel is assumed.

TABLE I

Resolution and bit-rates for various CIF formats

| CIF Format | Resolution (in pixels) | Bit Rate at 30 fps (Mbps) |
|---|---|---|
| SQCIF (Sub Quarter CIF) | 128 × 96 | 4.4 |
| QCIF (Quarter CIF) | 176 × 144 | 9.1 |
| CIF (Full CIF, FCIF) | 352 × 288 | 36.5 |
| 4CIF (4 × CIF) | 704 × 576 | 146.0 |
| 16CIF (16 × CIF) | 1408 × 1152 | 583.9 |

Video compression is a way of encoding digital video to take up less storage space and reduce required transmission bandwidth. Certain compression/decompression (CODEC) schemes are frequently used to compress video frames to reduce the required transmission bit rates. Overall, CODEC hardware or software compresses digital video into a smaller binary format than required by the original (i.e., uncompressed) digital video format.

H.263 is a document which describes a common contemporary CODEC scheme, requiring a bandwidth from 64 to 1920 Kbps. H.263 is an ITU standard for compressing video, and is generically known as a lossy compression method. Lossy coding assumes that some information can be discarded, which results in a controlled degradation of the decoded signal. The lossy coding method is designed to gradually degrade as a progressively lower bit rate is available for transmission. Thus, the use of lossy compression methods results in a loss of some of the original image information during the compression stage and, hence, the lost original image information becomes unrecoverable. For example, a solid blue background in a video scene can be compressed significantly with little degradation in apparent quality. However, other frames containing sparse amounts of continuous or repeating image portions often cannot be compressed significantly without a noticeable loss in image quality.

Many video compression standards, including MPEG, MPEG-2, MPEG-4, H.261, and H.263 utilize a block-based Discrete Cosine Transform (DCT) operation on data blocks, 8×8 samples in size. A set of coefficients for each block is generated through the use of a two-dimensional DCT operation. Such coefficients relate to a spatial frequency content of the data block. Subsequently, the 64 DCT coefficients (one for each sample) in a block are uniformly quantized. For H.263, one quantizer step size is applied to every DCT coefficient in a data block and is part of the information that must be transmitted to a H.263 decoder. The quantization process is defined as a division of each DCT coefficient by the quantization step size followed by rounding to the nearest integer. An encoder applies variable uniform quantization to DCT coefficients to reduce the number of bits required to represent them. Compression may be performed on each of the pixels represented by a two-by-two array of blocks containing luminance samples and two blocks of chrominance samples. This array of six blocks is commonly referred to as a macroblock. The four luminance and two chrominance data blocks in a macroblock combine to represent a 16×16 pixel array.

In an H.263 encoder, variable uniform quantization is applied by means of the quantization parameter that provides quantization step sizes that map the values of DCT coefficients to a smaller set of values called quantization indices. In the H.263 decoder, DCT coefficient recovery is performed, roughly speaking, by multiplying the recovered quantization indices by the inverse quantization step size. The decoder then calculates an inverse DCT using the recovered coefficients.

Although these and other compression methods have proven somewhat effective, there remains a need to compress digital video further to reduce bandwidth requirements. However, such additional compression techniques must not noticeably degrade video quality or increase bandwidth requirements. Therefore, there is a need for a system and method for dynamic perceptual coding of macroblocks in a video frame.

SUMMARY OF THE INVENTION

The present system and method overcomes or substantially reduces prior problems associated with transmission of high quality video images. In general, the present system and method provide increased subjective video quality without increasing bandwidth required to carry the video.

An embodiment of the present invention is provided which allows higher quality video images to be transmitted without a concomitant increase in a total number of video data bits transmitted per frame or group of frames. To accomplish this, quantization parameters are applied to DCT coefficients of macroblocks within a given video frame in a special way. A lower value of quantization parameter is applied near a central region of a video frame. This central region is referred to as a prime video region since a viewer will, in general, concentrate attention on this prime video region. Applying a lower value quantization parameter to the prime video region has the effect of increasing the bit density and, subsequently, increasing the video quality within that area. Outside of the prime video region, the bit density per macroblock is decreased so as to have a zero or near-zero net-gain in bit density over the entire video frame.

In an alternative embodiment of the present invention, a particular frame may be transmitted with an overall increase in the number of bits. However, in this embodiment, subsequent frames (or preceding frames) will have a decreased number of bits, thus, producing an overall zero or near-zero-sum net gain over a span of numerous video frames. By varying the number of bits between frames while maintaining an overall near zero-sum net gain, it is possible to transmit a video sequence with an increase in perceived quality while still maintaining a given bandwidth usage. The apparent increase in quality results from the application of quantization parameters having lower values within the prime video region and higher values outside the prime video region as described supra.

In another embodiment, there may be a plurality of prime video regions where quantization parameters are dynamically coded. In this case, the value of the quantization parameter will increase or decrease within a given prime video region based on a relative importance of a particular prime video region. Consequently, quantization parameters may be modified to enhance perceived video quality in a way that may vary depending on a video scene.

BRIEF DESCRIPTION OF THE DRAWINGS

FIG. 6 shows an exemplary H.263 encoder based embodiment of on parameter modification values used to change quantization values derived using traditional error measures.

DETAILED DESCRIPTION OF THE INVENTION

Figure 1:
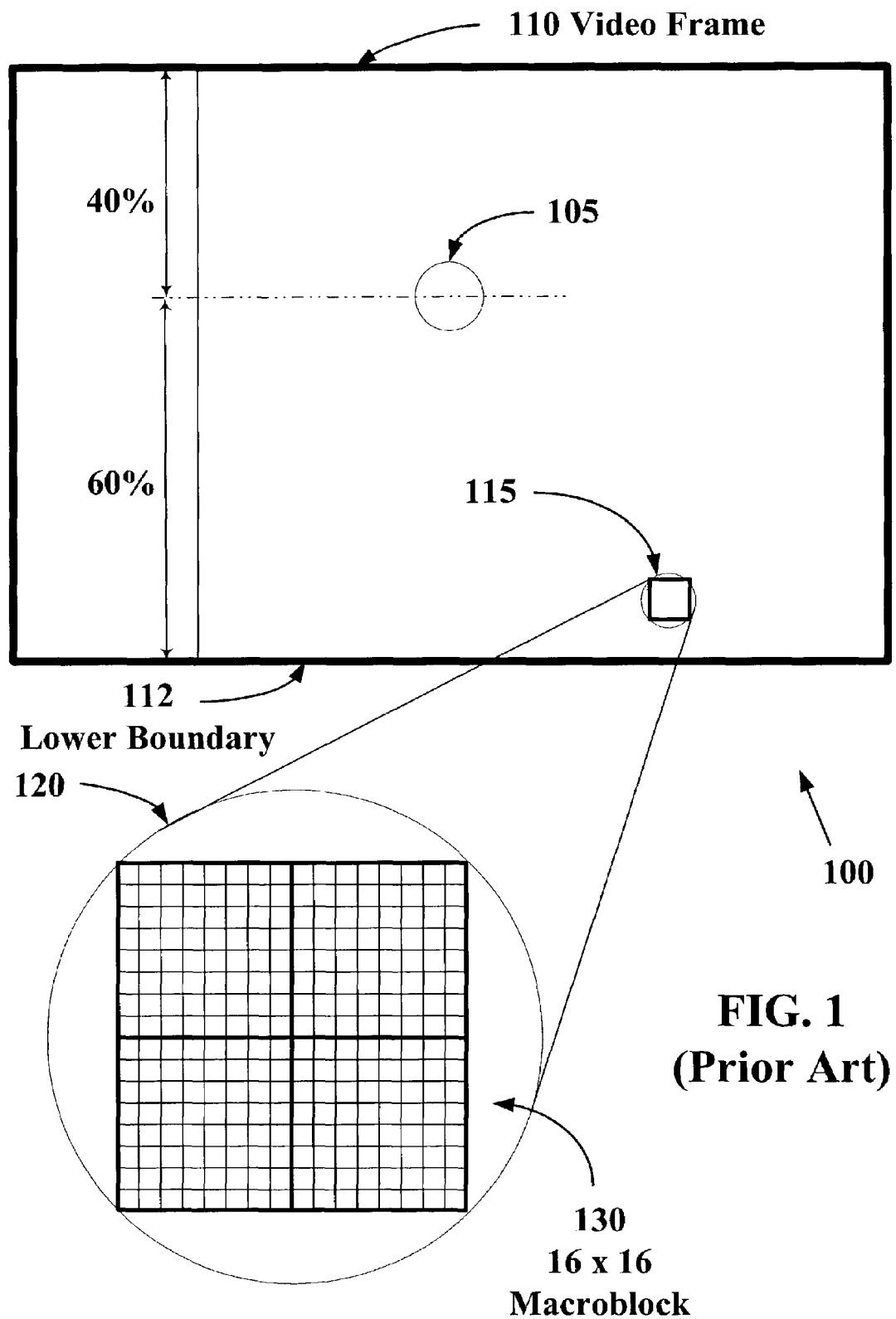
FIG. 1 shows an embodiment of a video frame with an exemplary lock and macroblock.

FIG. 1 illustrates a typical prior art video window 100, which may be, for example, a window on a computer screen, other display device, or a full or reduced screen image on a television. A video frame 110 shows an extent of a typical transmitted video image used in a video apparatus.

The video frame 110 comprises a plurality of macroblocks such as macroblock 115. An enlarged area 120 of the macroblock 115 shows a 16×16 pixel macroblock 115, 130. Typically, each frame of a video image is partitioned into macroblocks. Conventionally, a CIF format includes 22×18 macroblocks or 396 total macroblocks for full CIF.

A central viewing area 105 is indicated within video frame 110. The central viewing area 105 is frequently an area upon which a viewer's attention is most strongly focused. In one embodiment, the central viewing area 105 indicates a positional reference related to common framing of a single human face. A common framing technique in video imaging is to have a single person's head framed in the video window 100. Typically, such framing locates one of two human eyes in the central viewing area 105. The central viewing area 105 is located approximately in the center of the video frame 110 horizontally and at a vertical height that is close to 60% of the video frame 110 height as measured from a lower boundary 112 of the video frame 110. In the CIF format, the video frame 110 contains an array of 18 macroblocks in a vertical direction and 22 macroblocks in a horizontal direction.

Figure 2:
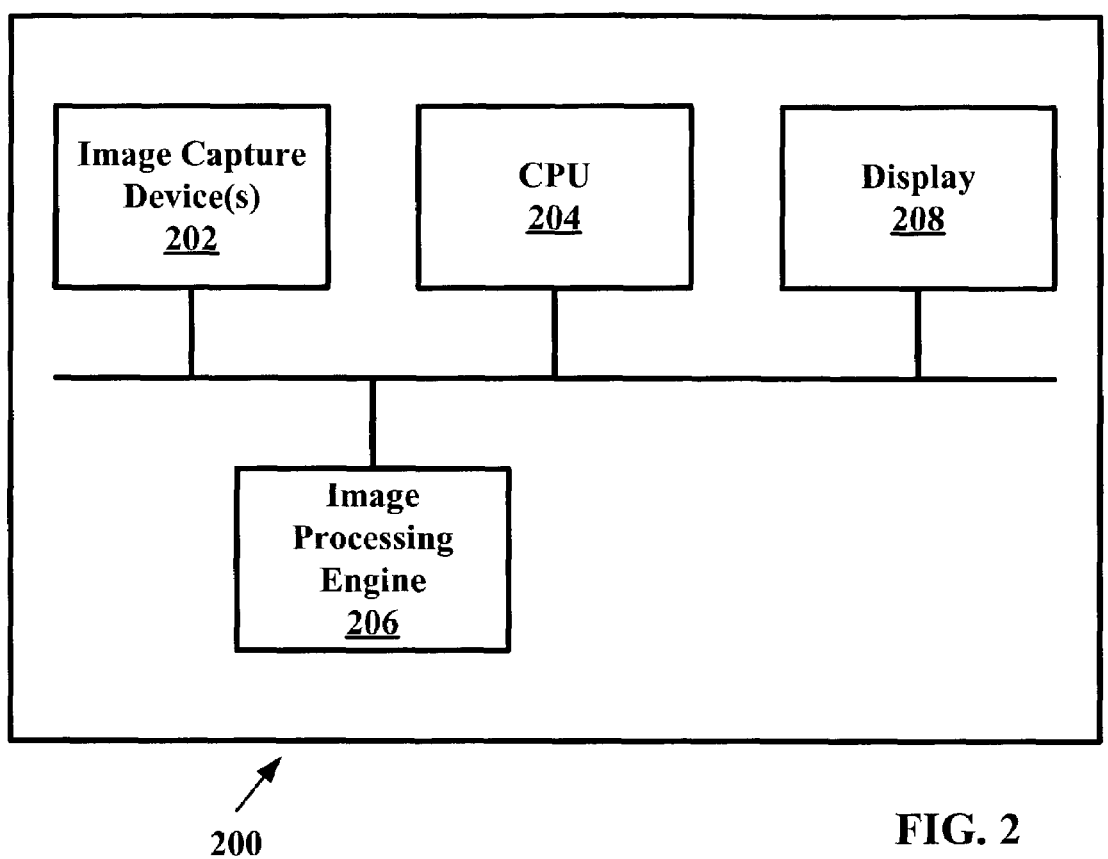
FIG. 2 shows an exemplary schematic of a video imaging system.

FIG. 2 shows a schematic embodiment of an exemplary video imaging system 200. The video imaging system 200 includes an image capture device 202, a central processing unit 204, an image processing engine 206, and either a local or remote display 208.

The image capture device 202 is used to capture any video in a scene. At least one analog or digital video camera may be used as the image capture device 202, for example. Other forms of image capture devices 202 are also contemplated by the present invention. The central processing unit or CPU 204 digitizes and coordinates all images received from the image capture device 202, keeps track of all pixels in a given macroblock 130 (FIG. 1), sends each macroblock 130 for compression coding to the image processing engine 206, and finally prepares the processed macroblocks for viewing on either the local or remote display 208.

In an alternative embodiment, the video imaging system 200 may be practiced using recorded images. The practice of using recorded images eliminates the need for the image capture device 202.

Figure 3:
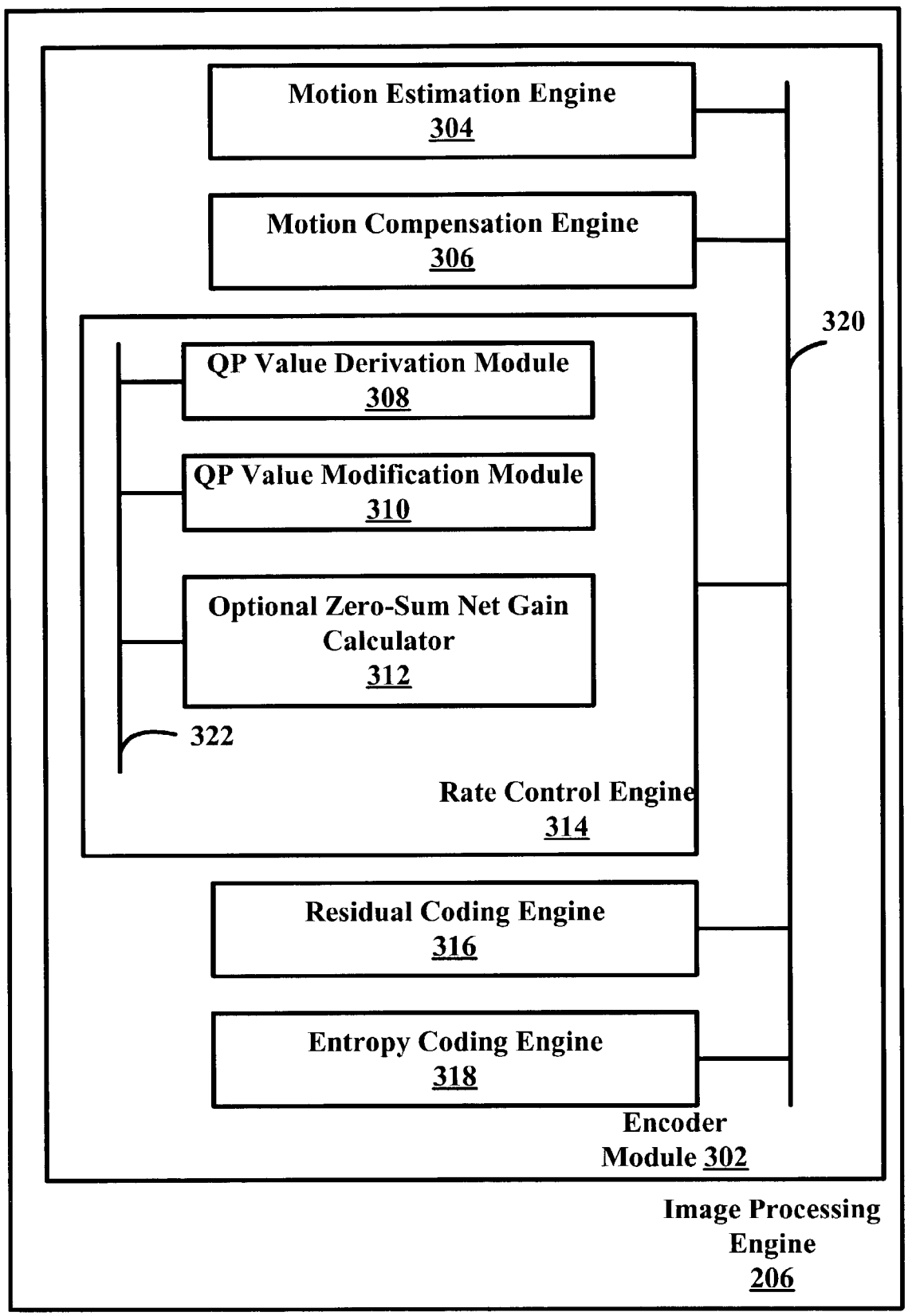
FIG. 3 shows an exemplary image processing engine.

FIG. 3 is a detailed embodiment of the exemplary image processing engine 206. The exemplary image processing engine 206 includes an encoder module 302. All components within the encoder module 302 are coupled via system buses 320, 322.

A motion estimation engine 304 identifies frame-to-frame redundancy in a video signal received from the image capture device 202. A prediction image is generated in a motion compensation engine 306 using parameters derived in the motion estimation engine 304. A rate control engine 314 generates a quantization parameter for each macroblock to control the average number of bits produced by the encoder each second. A residual coding engine 316 codes the difference between the motion compensated and the input images. An entropy coding engine 318 removes statistical redundancy from the data that is to be sent to a decoder. Further, the rate control engine 314 comprises two modules: a quantization parameter (QP) derivation module 308 designed to produce quantization parameter values using traditional (e.g., square error) measures to achieve the desired encoding bit rate; and a quantization (QP) modification module 310 which changes the quantization parameter values derived in the quantization parameter value derivation module 308 to achieve an image coding with higher perceived quality.

Additionally, the optional zero-sum net gain calculator 312 keeps track of whether a relative zero-sum net gain is maintained either within a given video frame (intra-frame) or over a plurality of frames (inter-frame). The latter inter-frame case is typically used when the intra-frame case does not yield a zero-sum net gain. A more detailed description of the rate control engine 314 and the optional inter- or intra-frame zero-sum net gain calculator 312 is given infra.

Figure 4:
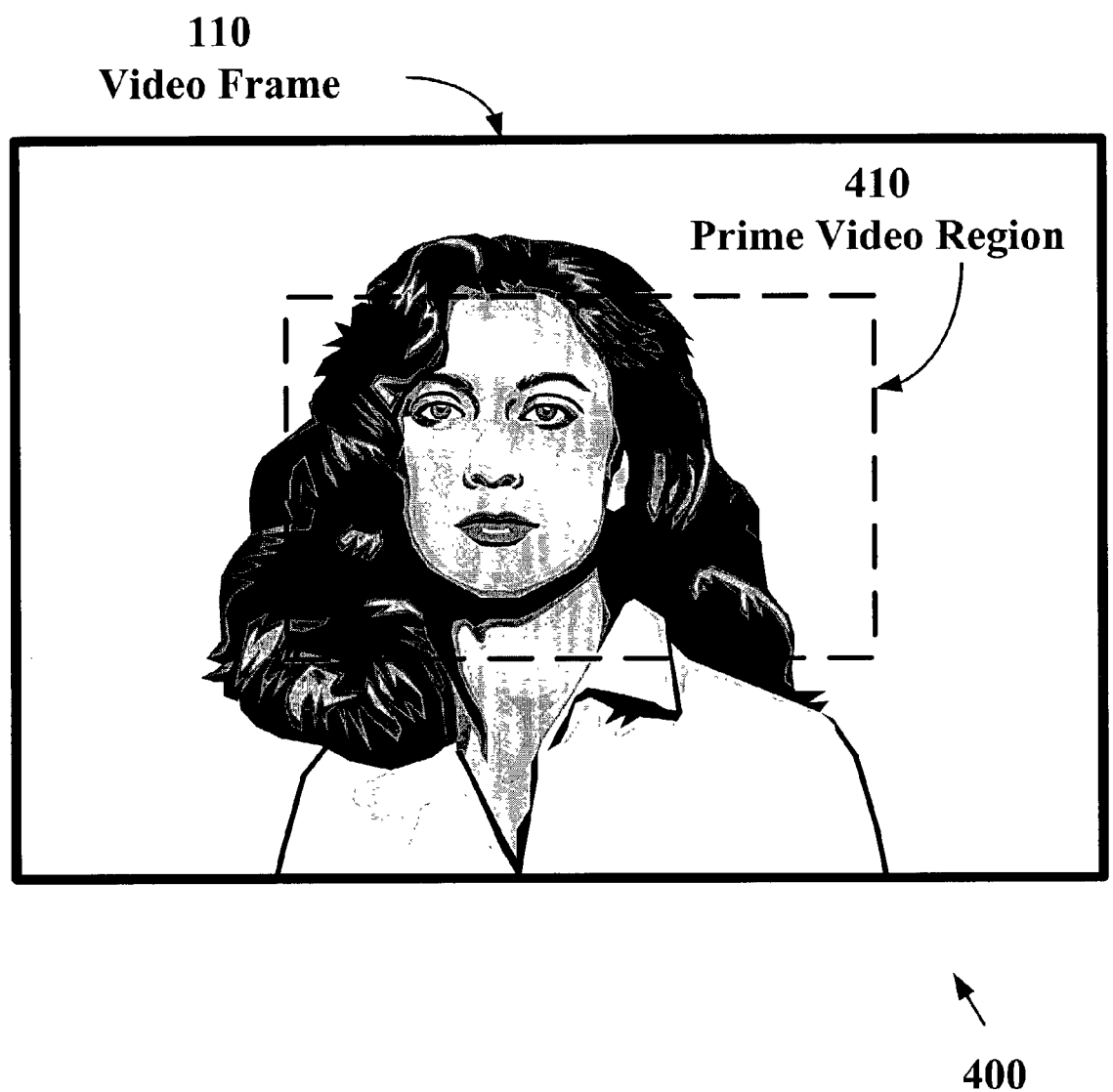
FIG. 4 shows a person framed in the prime video region of a video frame.

FIG. 4 shows an exemplary embodiment of a typical video window 400 in use. Contained within the typical video window 400 is an area referred to as a prime video region 410. The prime video region 410 is a region of the video window 400 on which a viewer of an image will typically focus his or her attention. (Consequently, central viewing area 105 (FIG. 1) is contained within the prime video region 410). In a videoconferencing application, the prime video region 410 is also a region where an individual's head image will typically be located. Alternatively, prime video region 410 may be another important viewing region on which a viewer's attention will be focused. An example of another important image on which a viewer's attention may be focused is a person's hands while communicating with sign language, such as American Sign Language (ASL). Consequently, one embodiment of the present invention will increase a number of video data bits through use of the exemplary image processing engine 206 (FIG. 2) within the prime video region 410, while other regions outside of the prime video region 410 may have a lower number of video data bits. Therefore, an overall bit allocation scheme will increase bit density in the prime video region 410 and minimize the number of video data bits outside of the prime video region 410.

In addition to the encoding algorithm normally optimizing for minimum mean-square-error, the encoding algorithm, in conjunction with the rate control engine 314 (FIG. 3), also optimizes for greatest perceptual quality under the assumption that the viewers attention will be on the prime video region 410. In one embodiment, a perceptual enhancement of the video frame 110 (FIG. 1) occurs with high quality coding of the regions that are expected to be important. Since more video data bits are now allocated to the prime video region 410, other areas must have a reduced bit density to maintain a constant overall bit usage. Preferably, the re-allocation of bit densities produces an overall zero-sum gain in a given frame. Alternatively, the re-allocation of bit densities produces an overall zero or near-zero net sum gain over a series of video frames as described supra.

Figure 5:
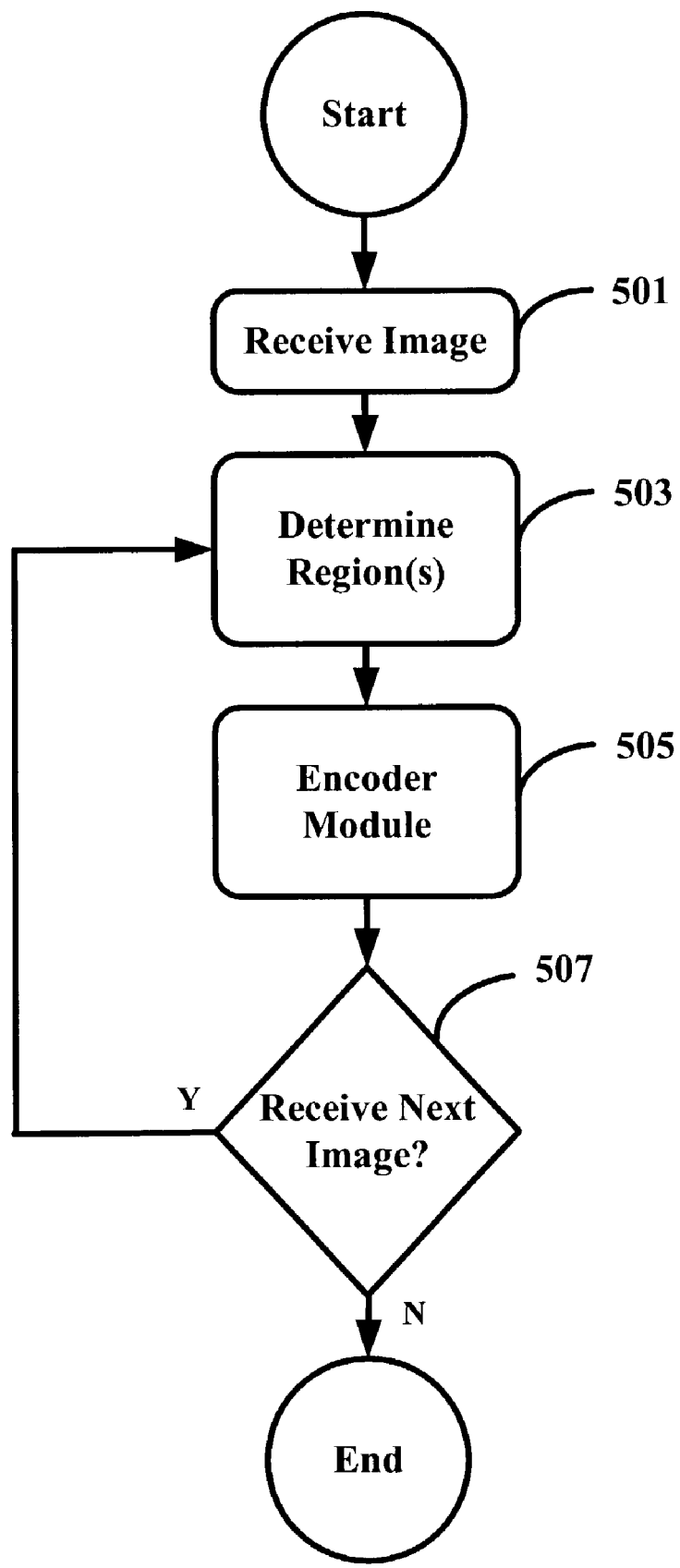
FIG. 5 shows an exemplary quantization parameter flowchart.

FIG. 5 shows an embodiment of one method for accomplishing the exemplary perceptual enhancement described above. First, an image is received 501 from the image capture device 202 (FIG. 2) and the prime video region is identified. An encoder module 505 comprises a rate control algorithm and an encoding algorithm (not shown). The rate control algorithm determines the values of the quantization parameter for each macroblock and the image is processed by the encoding algorithm. For example, an H.263 encoder may be used to assign DCT coefficients to each macroblock received from the image capture device 202. Once the DCT coefficients have been established, a quantization parameter, one for each macroblock, will be applied to each DCT coefficient. The value of the quantization parameter that is applied to the DCT coefficients in a macroblock varies inversely with the required bit density. This means that a lower quantization parameter will yield a particular macroblock within a frame with higher quality and, thus, more video data bits. The prime video region 410 (FIG. 4) will be a region that requires a lower quantization parameter. Conversely, areas outside of the prime video region 410 will be assigned a high quantization parameter. A high quantization parameter will yield a commensurately lower quality video macroblock but will require fewer video data bits. After the encoding process is complete, a determination 507 is made as to whether another image has been received. If another image has been received, a loop is made back to step 503 to determine the prime video region 410, and the method continues with subsequent steps as shown in FIG. 5. This process is continuous until video capture is completed.

FIG. 6 shows an exemplary set of quantization parameter modification values 600 contained within a standard FCIF window having 22×18 macroblocks. Each quantization parameter modification value 610 affects the quantization parameter for only one macroblock. Values of the quantization parameter modification values 610 become smaller (and increasingly negative) approaching a center of the prime video region 410 (FIG. 4). When summed with the quantization parameters produced in the quantization parameter value derivation module 308 (FIG. 3), the quantization parameter modification values 610 have the effect of reducing the net quantization parameter values approaching the center of the prime video region 410. This progressive reduction in quantization parameter values assures that the macroblocks which are most likely to be viewed in the video frame 110 (FIG. 1) will have a greatest number of video data bits.

Values of a quantization parameter associated with macroblocks located along edges of the video frame 110 will usually be higher to provide a balance for the increased bit density at the prime video region. The perceived quality of the video frame 110 is not reduced significantly by the higher quantization parameter values since the least important information is frequently contained in the edge regions. If the modified quantization parameter falls outside the allowed range for quantization parameter values, it is assigned to the closest value that is in range. For H.263, the allowed quantization parameter range is 1 to 32. A quantization parameter modification value 610 of zero ("0") will not change the value of the quantization parameter derived by the quantization parameter value derivation module 308. Preferably, a value of the quantization parameter does not change abruptly from one macroblock to an adjacent macroblock resulting in a noticeable sudden change in video quality.

In alternative embodiments, values of the quantization parameter modification values 610 may take on any real value. Specifically, the quantization parameter modification value 610 may be positive, negative, or zero. Also, the quantization parameter modification value 610 may be an integer or a fractional value. For example, values in a quantization parameter modification value 610 array could take on values of −0.35, 2, −1, 4.3, and 0.

In yet further embodiments, a total number of video data bits per video frame (i.e., intra-frame) may not exhibit a near zero-sum net gain. In this case, however, an inter-frame comparison will still exhibit a total zero-sum net gain (or close to it). For example, a first frame in a video image may have a quantization parameter gain of 126 quantization units. This will result in a coded video frame with fewer video data bits than an un-quantized video frame. The next frame or plurality of frames, however, may compensate by lowering their respective frame quantization units to account for the prior frame's net gain, resulting in an overall inter-frame net-gain of zero or near-zero.

According to the present system and method, quantization parameters are dynamically coded, and a quantization parameter modification value 610 array may vary depending on the video scene.

Particular to video images of faces, facial areas can be identified electronically. This identification may be accomplished in at least one of two ways: flesh color and facial features.

Algorithms exist that can identify a human face by flesh color. All races, regardless of skin color, have a common chrominance value (i.e., color components are the same); only the luminance values tend to vary greatly between various human races. However, very few objects, other than human flesh, have a similar chrominance value. Therefore, it is relatively easy to electronically determine facial features in a video scene.

Secondly, facial features may be readily detectable by pattern recognition algorithms. Such pattern recognition algorithms may specifically search for features such as eyes and a mouth to identify human faces.

In one embodiment of dynamic perceptual coding, once an important region (e.g., a human face) is identified in a video scene, the quantization parameters are reduced to increase the number of video data bits in the macroblocks in and around the facial region while allowing quantization parameters outside of this area, typically a background, to increase (thereby lowering the number of video data bits in the associated macroblocks). This embodiment varies from the foregoing perceptual coding embodiments in several ways. First, the least important regions in the video frame 110 are not necessarily near the video edges. Secondly, the quantization parameter modification value 610 array is no longer fixed but may, conceivably, vary from one frame to the next. In this embodiment, the quantization parameter modification value 610 array may vary in value, location, and/or shape of the prime video region 210 (FIG. 2). Additionally, the system may use facial recognition to follow the movement of a speaker, and thus change quantization parameters based on the changing prime video region 210. Therefore, consecutive frames will conceivably have different quantization parameter modification value 610 arrays.

Figure 7:
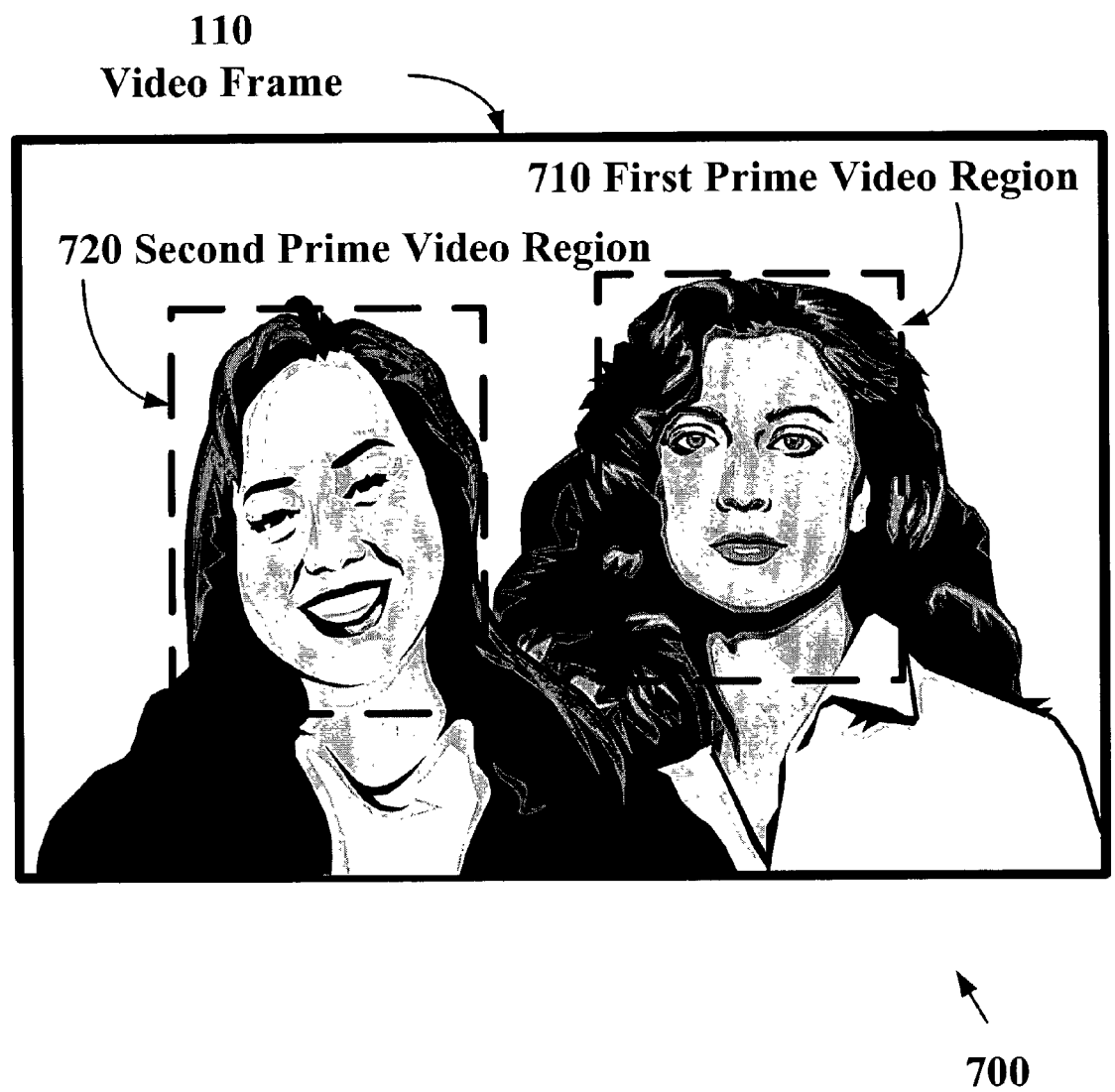
FIG. 7 shows two people framed in alternating prime video regions frame.

FIG. 7 shows an alternative embodiment of dynamic perceptual coding of a video scene 700. In this embodiment, values of low quantization parameters will shift from a first prime region 710 to a second prime region 720 in a video frame 110 (FIG. 1). Electronically, a determination of which of two individuals in the video frame 110 is communicating at a given time may be accomplished by using pattern recognition software. Subsequently, the first prime video region 710 will have lower values of quantization parameters when it is determined that the individual in the first prime video region 710 is speaking. Thus, the second prime video region 720 will have larger values than those of the first prime video region 710 for each of the quantization parameters associated with the macroblocks in the second prime video region 720. This exemplary embodiment may be extrapolated to a plurality of prime video regions when more than two individuals are contained within the video frame 110.

In an alternative embodiment, during a video scene 700 in which no individual is speaking, all macroblocks in the video frame 110 may be assigned relatively large quantization parameter values. When one or more individuals in the video frame 110 resume speaking, quantization parameters for the appropriate macroblocks in a given prime video region or regions will then assume lower values. The values of the quantization parameters are continually shifted frame-by-frame, as warranted, to increase or decrease the number of video data bits in a given prime video region or regions.

In still another embodiment, pupils of viewers may be tracked to determine an average "point-of-fixation". The average point-of-fixation is a region of a video frame upon which most viewers are focusing their attention at any given point in time. In this embodiment, the values of the quantization parameters are decreased in areas near and surrounding the point-of-fixation. The quantization parameters are increased outside of these areas. Exemplary applications of this embodiment include demonstrations performed via videoconferencing. Further, an example of such a demonstration where facial features may be of relatively low importance is sign language for the deaf (such as American Sign Language—ASL). In this example, the prime video region is an area surrounding a demonstrator's hands.

In a further embodiment, temporal changes can occur in the quantization parameter modification value 610 arrays. For example, after a relatively static image has been contained in the video frame 110 for some period of time, it is possible to slowly increase overall values of all quantization parameters without a discernible change in video quality. In this embodiment, the values of the quantization parameters in appropriate regions (e.g., the prime video region 710) are then reduced when the static image changes or a new video scene is introduced.

From the description of the exemplary embodiments of the process set forth herein, it will be apparent to one of ordinary skill in the art that variations and additions to the embodiments can be made without departing from the principles of the present invention. For example, a method whereby an entire three-dimensional (3D) volume could be transmitted and displayed in a video conferencing system as opposed to a two-dimensional area may be contemplated. This may be accomplished by holography or some other means. In this case, the quantization parameter modification values 610 would be in the form of a three-dimensional array. Additionally, similar perceptual coding techniques may be applied by using quantization parameter modification values 610 on unit cells other than macroblocks. Quantization parameter modification values 610 could be applied, for example, to blocks or pixels. Therefore, these and other variations upon the specific embodiments are intended to be covered by the present invention.

What is claimed is:

1. A system for dynamic perceptual coding of a plurality of elements of a video frame comprising:
   a processor;
   at least one image capture device coupled to the processor for capturing video of an image;
   an image processing engine coupled to the processor for dynamically quantizing the plurality of elements of the video frame; and
   a quantization parameter produced by the image processing engine for each of the plurality of elements, the quantization parameter being capable of producing a variable bit density for perceptual video quality improvement over the video frame.

2. The system of claim 1, wherein each of the plurality of elements is a macroblock.

3. The system of claim 1, wherein each of the plurality of elements is an 8×8 array of pixels.

4. The system of claim 1, wherein each of the plurality of elements is a pixel.

5. The system of claim 1, further comprising at least one prime video region contained within a variable bit-density video frame.

6. The system of claim 5, wherein the at least one prime video region each contains a variable relatively-high bit-density and a region outside of the plurality of prime video regions containing a relatively-low bit-density.

7. The system of claim 6, wherein the variable relatively-high bit-density and the relatively-low bit-density regions are combinable in summation so as to produce a near zero net-gain in bit-density.

8. The system of claim 5, wherein the at least one prime video region each have differing amounts of the variable relatively-high bit densities.

9. The system of claim 5, wherein a location of the at least one prime video region may vary from one video frame to a successive video frame.

10. The system of claim 5, wherein a shape of the at least one prime video region each may vary from one video frame to a successive video frame.

11. The system of claim 5, wherein a location of the at least one prime video region each may vary based upon a facial recognition algorithm used to define at least one of the prime video regions.

12. The system of claim 1, wherein the quantization parameter produced by the image processing engine for each of the plurality of elements collectively forms a quantization parameter matrix, the quantization parameter matrix being variable in value from one video frame to a successive video frame.

13. The system of claim 1, further comprising a plurality of variable bit-density video frames within a videoconferencing transmission, wherein a subsequently transmitted variable bit-density frame may not be equal to a previously transmitted variable bit-density frame in total bit-density.

14. The system of claim 13 wherein the plurality of variable bit-density video frames within the videoconferencing transmission has an overall near zero-sum net gain in pixel density.

15. The system of claim 1, wherein the image processing engine further comprises an encoder module.

16. The system of claim 1, wherein the image processing engine further comprises a quantization module.

17. The system of claim 1, wherein the image processing engine further comprises a zero-sum net gain calculator.

18. The system of claim 1, wherein the quantization parameter changes gradually in numeric magnitude from one of the plurality of elements to the next.

19. The system of claim 1, wherein a value of the quantization parameter is any real number.

20. The system of claim 1, wherein a value of the quantization parameter may take on a value of zero to prevent any change in a coefficient of a video frame element.

21. A system for dynamic perceptual coding of a plurality of elements of a video frame comprising:
   a processor;
   at least one source of a recorded image coupled to the processor for producing video of the recorded image;
   an image processing engine coupled to the processor for dynamically quantizing the plurality of elements of the video frame; and
   a quantization parameter produced by the image processing engine for each of the plurality of elements, the quantization parameter being capable of producing a variable bit density for perceptual video quality improvement over the video frame.

22. The system of claim 21, wherein each of the plurality of elements is a macroblock.

23. The system of claim 21, wherein each of the plurality of elements is an 8×8 array of pixels.

24. The system of claim 21, wherein each of the plurality of elements is a pixel.

25. A system for dynamic perceptual coding of macroblocks comprising:
   a processor;
   at least one image capture device coupled to the processor for capturing video of an image; and
   an image processing engine coupled to the processor for dynamically quantizing the macroblock, the image processing engine having
      an encoder module for applying a compression or a decompression algorithm to the macroblock;
      a quantization module for applying a dynamic quantization parameter to each of the macroblocks in a video frame, the dynamic quantization parameter being capable of producing a variable bit density over the video frame; and
      a zero-sum net gain calculator for tracking whether a relative zero-sum net gain is maintained within a given video frame or over a plurality of frames.

* * * * *